US008649444B2

(12) United States Patent
Drumeller

(10) Patent No.: US 8,649,444 B2
(45) Date of Patent: Feb. 11, 2014

(54) TWACS PULSE INDUCTOR REVERSAL CIRCUIT

(71) Applicant: Aclara Power-Line Systems Inc., Hazelwood, MO (US)

(72) Inventor: Joshua K. Drumeller, Florissant, MO (US)

(73) Assignee: Aclara Power-Line Systems Inc., St. Louis, MO (US)

( * ) Notice: Subject to any disclaimer, the term of this patent is extended or adjusted under 35 U.S.C. 154(b) by 0 days.

(21) Appl. No.: 13/669,773

(22) Filed: Nov. 6, 2012

(65) Prior Publication Data

US 2013/0121426 A1 May 16, 2013

Related U.S. Application Data

(60) Provisional application No. 61/559,794, filed on Nov. 15, 2011.

(51) Int. Cl.
*H04B 3/00* (2006.01)
*H04L 25/00* (2006.01)

(52) U.S. Cl.
USPC ............. 375/257; 340/12.38; 334/12; 334/56

(58) Field of Classification Search
USPC ................ 340/12.31, 12.32, 12.38; 375/257; 336/117; 334/12, 56
See application file for complete search history.

(56) References Cited

U.S. PATENT DOCUMENTS

| 5,043,633 A | 8/1991 | Perkins |
| 5,933,072 A | 8/1999 | Kelley |
| 8,531,858 B2 * | 9/2013 | Alexander ................... 363/132 |
| 2005/0116699 A1 | 6/2005 | Mazda |
| 2011/0115285 A1 | 5/2011 | Ransom et al. |

FOREIGN PATENT DOCUMENTS

WO    2011037509 A1    3/2011

* cited by examiner

*Primary Examiner* — Curtis Odom
(74) *Attorney, Agent, or Firm* — Polster, Lieder, Woodruff & Lucchesi, L.C.

(57) ABSTRACT

A circuit (C1-C4) is employed in a TWACS transponder (T) installed in an electric meter (M). The transponder generates inbound signals (IB) transmitted from the location of the electric meter to a central location (R). Firmware (F) within the transponder controls the flow of current for each pulse through the circuit by triggering a semi-conductor device such as a SCR (X1) or TRIAC (X2). The resulting current flow through the inductor for a subsequent pulse, regardless of the pulse's polarity, will be in the opposite direction to that of the previous pulse. The result is to maintain a constant level of magnetization of the inductor core which does not have to be overcome by energy in the subsequent pulse resulting in amplitude of all the pulses imposed on an AC waveform being substantially the same.

17 Claims, 2 Drawing Sheets

TWACS PULSE INDUCTOR REVERSAL CIRCUIT

CROSS-REFERENCE TO RELATED APPLICATIONS

This application claims the benefit of U.S. Provisional application Ser. No. 61/559,794, filed Nov. 15, 2011, which is incorporated herein by reference.

STATEMENT REGARDING FEDERALLY SPONSORED RESEARCH

Not Applicable.

BACKGROUND OF THE INVENTION

This invention relates to a two-way automatic communications system (TWACS®) used by electrical utilities for communicating over power transmission lines; and, more particularly, to an inductor based signaling circuit used in generating TWACS signals.

In two-way communications involving TWACS, transponders are employed. At a user site, the transponder is installed in the facility's electric meter. Messages (commonly referred to as "outbound signals") are sent from a central location (e.g., a sub-station) to the user site to determine if an outage has occurred at the site, inquire about current electrical usage, turn an appliance "on" or "off", etc. The transponder in the electric meter receives and decodes the outbound signal, and when a response (commonly referred to as an "inbound signal") is to be transmitted back to the central location, generates and transmits the signal.

In creating signals transmitted via a TWACS, a current pulse of positive or negative polarity is imposed on a half cycle of the AC waveform transmitted over the utility's power lines, this being done using a communications channel involving one or more of the various phases of the AC, and neutral. Formulating an inbound signal requires using different patterns of positive and negative pulses to create the message being transmitted. Some of these pulse patterns have more pulses of one polarity than the other. As part of the message formation, the respective pulses are propagated through the inductor employed by the transponder with positive pulses causing current flow in one direction through the inductor and negative pulses causing current flow in the opposite direction. Over time, the flow of current through the inductor, in one direction or the other, will affect the level of magnetization of the core around which the inductor is wound.

In creating a TWACS inbound communications using an inductor made with a magnetic core material, the current pulse (which resembles a DC pulse) causes the core to be magnetized in one direction. When a pulse occurs that produces current flow in the opposite direction, significant energy is used to overcome this magnetization which results in a pulse having a smaller amplitude than it would otherwise have. During the creation of a TWACS inbound message, multiple pulses of each polarity are produced and a buildup in core magnetization can result. The effect of this causes each inbound pulse to have a variable and substantially unpredictable magnitude. The resulting irregular amplitudes of the signals imposed on the AC waveform so affects the resulting inbound signal as to, in some applications, be outside of the design criteria for the system. One solution to this problem involves modifying or changing the inductor used in the transponder but doing so has size implications which may make it difficult for the transponder to fit within its allotted space in the electric meter; and, there are weight and cost implications to be considered as well.

The present invention provides an effective solution to this problem while negating the need for a new inductor or other system modifications.

BRIEF SUMMARY OF THE INVENTION

The present invention is directed to apparatus and a method used to produce TWACS inbound communications in which the height or amplitude of all the pulses comprising the transmitted signal, regardless of their polarity, are substantially uniform or equal. Use of the apparatus and method allows the use of numerous types of iron core inductors without having to worry about the magnetization effect on pulses used to produce inbound communications.

As apparatus, the invention comprises a circuit employed in a TWACS transponder installed in an electric meter, the transponder generating inbound signals transmitted from the location of the electric meter to a central location. The transponder includes an inductor through which the current flows and the circuit controls the direction of current flow through the inductor by the switching of semi-conductor devices such as SCRs or TRIACs. Firmware within the transponder monitors flow of current through the inductor. In one embodiment of the invention, the firmware controls triggering of the devices so that current flow through the inductor for one pulse is in the opposite direction of current flow for the previous pulse. This results in the magnetization of the inductor core remaining substantially constant. Consequently, any differences or irregularities in the amplitude between pulses occurring in one direction with those occurring in the opposite direction are eliminated and stable inbound communications from the meter to the central location is affected.

In another embodiment of the invention, the firmware controls switching of the devices so that current flow through the inductor is always in the same direction regardless of the polarity of the pulse so to achieve the same result of stable inbound communications.

As a method, the invention requires monitoring the direction of current flow through an inductor for each pulse propagated through the inductor, and controlling a switching circuit by which current flow through the inductor for the next pulse is in the opposite direction from that of the previous pulse. The reversal of current flow for each pulse occurs regardless of whether the subsequent pulse is of the same or opposite polarity as the previous pulse. Again, the result is to achieve stable inbound communications.

In an alternate embodiment of the method, control of current flow through the inductor is controlled so that it is always in the same direction regardless of the polarity of the pulse propagated through the inductor.

The circuit can also be used for TWACS' outbound communications; although the circuit configuration will be different and somewhat complex. But, the principal of reversing flow is the same.

The circuit is low cost, readily incorporated in a transponder, and does not adversely affect other operations of the transponder.

Other objects and features will be in part apparent and in part pointed out hereinafter.

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
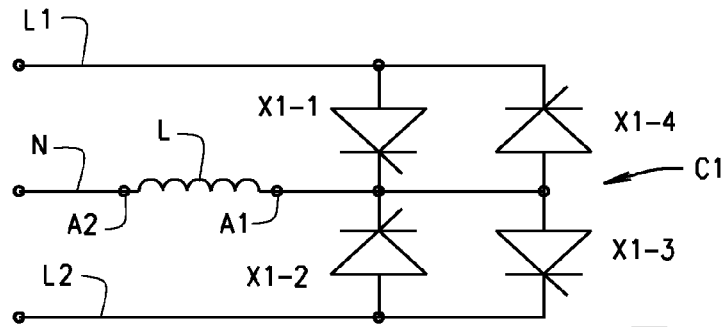
FIG. 1 is a schematic diagram of a first embodiment of a circuit of the present invention.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 5:
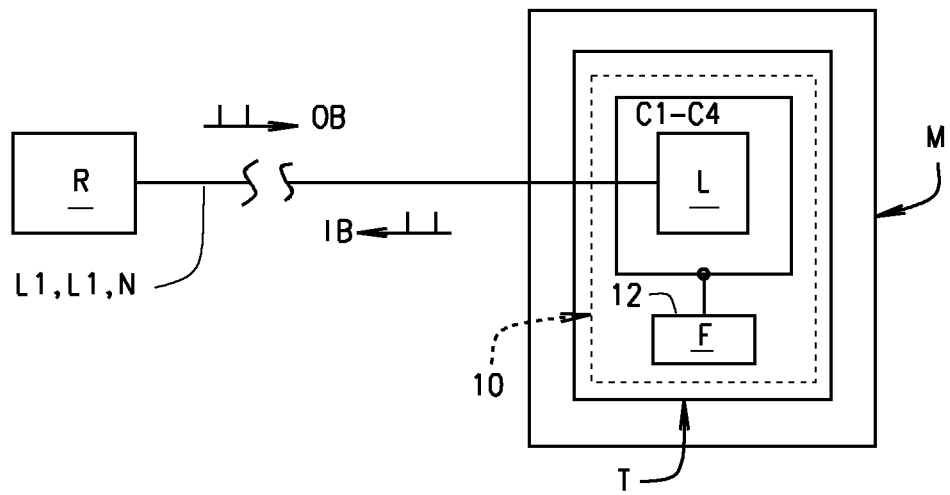
FIG. 5 is a simplified representation of a utility communication system employing TWACS.

Referring to FIG. 5, an electric meter M is installed at a site (home, factory building, office building, etc.) supplied electricity by a utility over transmission lines L1, L2, etc. and in some instances including a neutral line N. A TWACS employed by the utility is used to transmit outbound OB signals from a central location of the utility such as a sub-station R to the site where meter M is located. A transponder T installed in meter M processes the communication and generates and transmits a reply signal or inbound communication IB back to the sub-station. In formulating the inbound communications signal, a pattern of pulses comprising positive and negative pulses are imposed across an inductor L installed within the transponder. As previously discussed, it has been found that the difference in the number pulses of different polarity that produce current flow in opposite directions through the inductor results in a level of magnetization of the inductor's core that adversely affects the amplitude of the signals causing current flow in one direction through the inductor. This results from the amount of pulse energy required to overcome the level of magnetization. As noted, this affects the quality of the inbound communications because the amplitude of the signals is irregular and varies depending upon the TWACS message sent.

In accordance with the present invention, an apparatus 10 (see FIG. 5) and a method for controlling current flow through the inductor, and the level of flux in the core of the inductor, are provided to overcome any pulse magnitude irregularity which might otherwise occur. Referring to FIGS. 1-4, inductor L is now connected in one of the embodiments of an electrical circuit C1-C4. These respective circuits comprise switch means for controlling the direction of current flow through inductor L for each pulse propagated through the inductor regardless of the polarity of the voltage.

Figure 4:
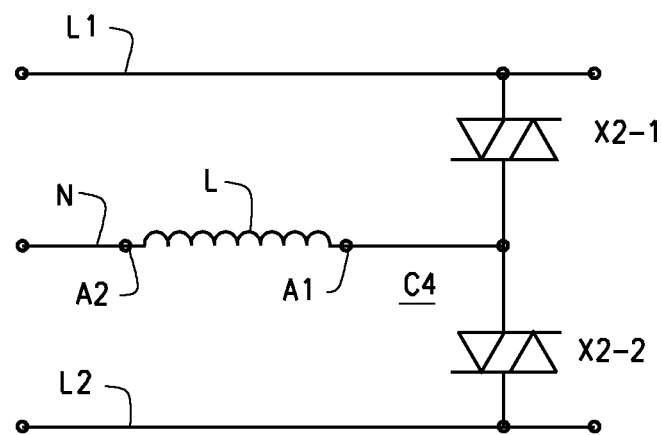
FIG. 4 is a schematic diagram of a fourth embodiment thereof.

In FIGS. 1 and 4, power transmission lines include the neutral line N and inductor L is installed in this line. In the circuit C1 of FIG. 1, the switch means comprises SCRs X1-1 to X1-4 and these semi-conductor devices are connected between one terminal A1 of the inductor and each of the power transmission lines L1 and L2. That is, SCRs X1-1 and X1-4 are connected in parallel between terminal A1 and transmission line L1, and SCRs X1-2 and X1-3 are connected in parallel between terminal A1 and transmission line L2. In circuit C4 of FIG. 4, the switch means comprises TRIACs X2-1 to X2-2 and these semi-conductor devices are connected between terminal A1 of the inductor and the respective power transmission lines L1 and L2. That is, TRIAC X2-1 is connected between terminal A1 and transmission line L1, and TRIAC X2-2 is connected between terminal A1 and transmission line L2. With respect to FIG. 1, it will be understood by those skilled in the art that the parallel sets of SCRs shown in circuit C1 could be replaced by a single TRIAC so that the circuits C1 and C4 of FIGS. 1 and 4 are essentially the same.

Figure 2:
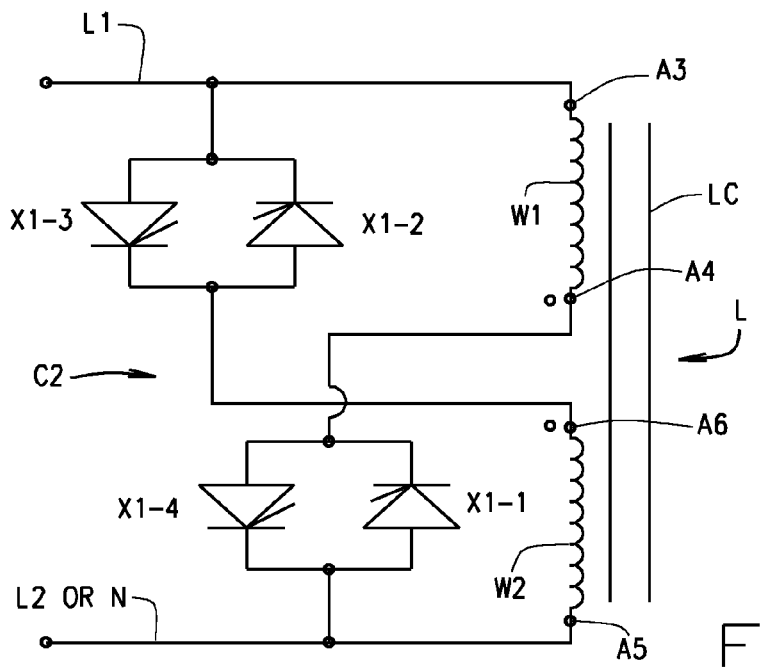
FIG. 2 is a schematic diagram of a second embodiment thereof.

In FIG. 2, inductor L is connected between transmission lines L1 and L2. In this embodiment, the inductor comprises two sets W1 and W2 of windings with both sets of windings wound around inductor core LC. In the circuit C2 of FIG. 2, the switch means again comprises SCRs X1-1 to X1-4 and these semi-conductor devices are connected between the respective sets of windings and the power transmission lines L1 and L2. Now, SCRs X1-1 and X1-4 are connected in parallel between a terminal A4 of the set W1 of windings and transmission line L2, or neutral line N. Similarly, SCRs X1-2 and X1-3 are connected in parallel between a terminal A6 of the set W2 of windings and transmission line L1. Again it will be understood that the two parallel sets of SCRs could each be replaced with a TRIAC.

Figure 3:
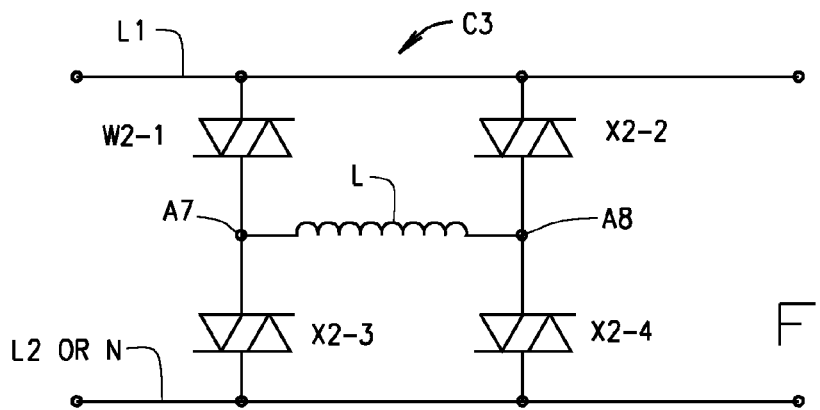
FIG. 3 is a schematic diagram of a third embodiment thereof.

In FIG. 3, the switch means comprises TRIACs X2-1 to X2-4. In circuit C3, a TRIAC X2-1 is connected between a terminal A7 of inductor L and transmission line L1, and a TRIAC X2-2 is connected between terminal A8 of the inductor and this transmission line. Further, a TRIAC X2-3 is connected between a terminal A7 of inductor L and transmission line L2, and a TRIAC X2-4 is connected between terminal A8 of the inductor and this transmission line.

Referring again to FIG. 5, apparatus 10 next includes a monitoring means 12 which monitors the direction of current flow through inductor L with the occurrence of each pulse. The monitoring means, which is implemented using firmware, controls the switch means for the respective circuits C1-C4 to route current flow through the inductor in the opposite direction from that of current flow for the previous pulse. Importantly, this routing of current flow in the opposite direction through the inductor is done regardless of whether the previous pulse and the subsequent pulse are of the same or the opposite polarity. In operation, means 12 senses the flow of current through inductor L for any pulse propagated through the inductor. The monitoring means then controls switching of the respective semiconductor devices in the respective circuits so that current flow through the inductor, when the next pulse is transmitted through it is in the opposite direction to that of the previous pulse. Therefore, even if two successive pulses are of the same polarity, the current flow path through the inductor will be opposite to that of the previous pulse.

The significance of this that it allows the magnetization effect of the inductor core to remain substantially constant for each pulse regardless of polarity. Since the current flow through the inductor is controlled, each pulse now uses the same amount of energy to overcome the magnetization effect caused by the previous pulse. This results in the pulses comprising the transmitted inbound communication all having substantially the same amplitude; rather than having an irregular or varying magnitude.

With respect to the circuits C1 and C4 of FIGS. 1 and 4 respectively, for a positive half-cycle, SCR X1-1 or TRIAC X2-1 is triggered by monitoring means 12 for current to flow from right-to-left through inductor L. If SCR X1-3 or TRIAC X2-2 is instead triggered, current flow will be from left-to-right through the inductor. For a negative half-cycle, monitoring means 12 triggers SCR X1-2 or TRIAC X2-2 to allow current to flow from right-to-left through the inductor. If SCR X1-4 or TRIAC X2-1 is triggered, current flow is left-to-right through the inductor.

With respect to circuit C2, the sets W1 and W2 of windings are, as shown in FIG. 2, wound opposite each other. Now, for example, if SCRs X1-1 and X1-4 are switched so as to allow current flow through set W1 of windings, this will cause magnetic flux to flow in the opposite direction around core LC than if SCRs X1-2 and X1-3 are switched so as to allow current flow through set W2 of windings.

With respect to circuit C3, for a positive half-cycle, TRIACs X2-1 and X2-4 are triggered by monitoring means 12 for current to flow from left-to-right through inductor L. If TRIACs X2-2 and X2-3 are triggered, current flow will be from right-to-left through the inductor. For a negative half-cycle, monitoring means 12 triggers TRIACs X2-1 and X2-4 to allow current to flow from right-to-left through the inductor. If TRIACs X2-2 and X2-3 are triggered instead, current flow is left-to-right through the inductor.

In an alternate embodiment of the invention, monitoring means 12 controls the switch means to route current flow through the inductor in only one direction. Accordingly, regardless of whether one pulse is a positive pulse and the next pulse is a negative pulse, the SCRs or TRIACs used in the respective circuits C1-C4 are switched so that the current flow through the inductor is in the same direction as the current flow for the previous pulse. Since current flow is now always in the same direction no energy will have to be expended by any pulse, whatever its polarity, to overcome the level of magnetization of the inductor.

By use of apparatus 10, and in accordance with the method of the invention, transponder T can employ different types of iron core inductors L without the magnetization effect of the inductor core material affecting the pulses used to produce inbound communications. In this regard, it will be understood by those skilled in the art that the inductor L of FIG. 2 will be larger than some other inductors which may be used because of the two sets of windings wound around the same core.

In view of the above, it will be seen that the several objects of the invention are obtained and other advantageous results achieved.

What is claimed is:

1. In a transponder for use in a TWACS for transmitting inbound communications from a location where the transponder is located to another location over a utility's power transmission lines, the inbound communications being composed of positive and negative pulses imposed on an AC waveform and the transponder including an inductor through which the pulses are propagated, apparatus for controlling current flow through the inductor comprising:
   an electrical circuit to which the inductor is connected, the circuit comprising switch means controlling the direction of current flow through the inductor for each pulse propagated therethrough; and,
   monitoring means monitoring the direction of current flow through the inductor with the occurrence of each pulse, the monitoring means controlling the switch means to route current flow through the inductor in the opposite direction from that of current flow for the previous pulse regardless of whether the previous pulse and the subsequent pulse are of the same or a different polarity, whereby the magnetization of a core of the inductor does not have to be overcome by energy in the subsequent pulse but is maintained at a level that allows the resulting amplitude, whether positive or negative, of all the pulses imposed on the AC waveform to be substantially constant.

2. The apparatus of claim 1 in which the monitoring means alternately controls the switch means to route current flow through the inductor in only one direction regardless of whether the pulse is a positive pulse or a negative pulse whereby propagation of either polarity pulse through the inductor does not require overcoming the magnetization level of the inductor core for the amplitude of all the pulses imposed on the AC waveform to be substantially constant.

3. The apparatus of claim 1 in which the monitoring means is implemented in firmware.

4. The apparatus of 3 in which the semi-conductor devices are SCRs.

5. The apparatus of claim 3 in which the semi-conductor devices are TRIACs.

6. The apparatus of claim 1 in which the power transmission lines include a neutral line in which the inductor is installed and the semi-conductor devices are connected between one terminal of the inductor and each of the other power transmission lines.

7. The apparatus of claim 1 in which the inductor comprises multiple sets of windings wound around the core, and the semi-conductor devices are connected between one terminal of each set of windings and a respective power transmission line.

8. In a transponder for use in a TWACS for transmitting inbound communications from a location where the transponder is located to another location over a utility's power transmission lines, the inbound communications being composed of positive and negative pulses imposed on an AC waveform and the transponder including an inductor through which the pulses are propagated, a method for controlling current flow through the inductor comprising:
   connecting the inductor in an electrical circuit including switch means controlling the direction of current flow through the inductor for each pulse propagated therethrough;
   monitoring the direction of current flow through the inductor for each pulse propagated through the inductor; and,
   controlling the switch means to route current flow through the inductor in the opposite direction from that of the current flow for the previous pulse regardless of whether the previous pulse and the subsequent pulse are of the same or opposite polarity whereby the magnetization of a core of the inductor does not have to be overcome by energy in the subsequent pulse but is maintained at a level that allows the resulting amplitude, whether positive or negative, for all the pulses imposed on the AC waveform to be substantially constant.

9. The method of claim 8 in which the semi-conductor devices are SCRs.

10. The method of claim 8 in which the semi-conductor devices are TRIACs.

11. The method of claim 8 in which the power transmission lines include a neutral line in which the inductor is installed and the method further includes connecting the semi-conductor devices between one terminal of the inductor and each of the other power transmission lines.

12. The method of claim 8 in which the inductor comprises multiple sets of windings wound around the core and the method further includes connecting the semi-conductor devices between one terminal of each set of windings and a respective power transmission line.

13. In a transponder for use in a TWACS for transmitting inbound communications from a location at which the transponder is located to another location over a utility's power transmission lines, the inbound communications being composed of positive and negative pulses imposed on an AC waveform and the transponder including an inductor through which the pulses are propagated, a method for controlling current flow through the inductor comprising:

connecting the inductor in an electrical circuit including switch means controlling the direction of current flow through the inductor for each pulse propagated therethrough;

monitoring the direction of current flow through the inductor for each pulse propagated through the inductor; and, controlling the switch means to route current flow through the inductor in the same direction as that of the current flow for the previous pulse regardless of whether the previous pulse and the subsequent pulse are of the same or a different polarity, whereby the magnetization of a core of the inductor does not have to be overcome by energy in a subsequent pulse which is of a different polarity than the previous pulse for the amplitude for all the pulses imposed on the AC waveform, whether positive or negative, to be substantially constant.

14. The method of claim 13 in which the semi-conductor devices are SCRs.

15. The method of claim 13 in which the semi-conductor devices are TRIACs.

16. The method of claim 13 in which the power transmission lines include a neutral line in which the inductor is installed and the method further includes connecting the semi-conductor devices between one terminal of the inductor and each of the other power transmission lines.

17. The method of claim 13 in which the inductor comprises multiple sets of windings wound around the core and the method further includes connecting the semi-conductor devices between one terminal of each set of windings and a respective power transmission line.

* * * * *